United States Patent [19]

Greenhalgh et al.

[11] 3,994,679
[45] Nov. 30, 1976

[54] DISPERSE DYESTUFF MIXTURES
[75] Inventors: Colin William Greenhalgh; Ronald Wynford Kenyon; Andrew John Logan, all of Manchester, England
[73] Assignee: Imperial Chemical Industries Limited, London, England
[22] Filed: July 28, 1975
[21] Appl. No.: 599,344

[30] Foreign Application Priority Data
July 31, 1974 United Kingdom............... 33699/74

[52] U.S. Cl.................................. 8/26; 8/39 C; 8/41 C; 8/179
[51] Int. Cl.² .................. D06P 1/00; C09B 45/48
[58] Field of Search ............................. 8/26

[56] References Cited
UNITED STATES PATENTS
3,036,875  5/1962  Schlack et al. ............ 8/32
3,413,075  11/1968  Rotcop ...................... 8/26
3,942,946  3/1976  Okaniwa et al. ............ 8/26
3,948,598  4/1976  Okaniwa et al. ............ 8/41 C Primary Examiner—Joseph L. Schofer
Assistant Examiner—A. L. Clingman
Attorney, Agent, or Firm—Darby & Cushman Cushman

[57] ABSTRACT

A process to color in blue to black shades aromatic polyester textile materials by dyeing, padding or printing an aqueous dispersion of a dyestuff mixture of three or four specific azo and anthraquinone disperse dyes.

3 Claims, No Drawings

DISPERSE DYESTUFF MIXTURES

This invention relates to mixtures of disperse dyestuffs and their use for coloring aromatic polyester textile materials.

According to the invention there is provided a process for the coloration of aromatic polyester textile materials which comprises applying to the said textile material by a dyeing, padding or printing process an aqueous dispersion of a dyestuff mixture consisting of:

a. from 2 to 60% by weight (based on the total weight of dyestuffs in the mixture) of a water insoluble monoazo dyestuff, free from sulphonic and carboxylic acid groups, which is of the formula:

Formula I

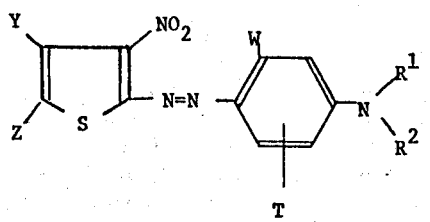

wherein

Y is hydrogen, lower alkyl, optionally substituted phenyl or nitro; Z is nitro, cyano, optionally substituted phenyl, optionally substituted lower alkoxycarbonyl or carbonamido; T is hydrogen, optionally substituted lower alkyl or optionally substituted lower alkoxy;

W is an acylamino group of the formula:

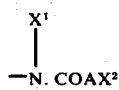

wherein $X^1$ is hydrogen or lower alkyl, $X^2$ is hydrogen or an optionally substituted hydrocarbon or heterocyclic radical, and A is a direct link or —O— or

and $R^1$ and $R^2$ each independently represent a hydrogen atom or an optionally substituted alkyl radical or $R^1$ and $R^2$ together form with the nitrogen atom N a 5- or 6-membered nitrogen-containing heterocyclic ring;

b. from 40 to 95% by weight (based on the total weight of dyestuffs in the mixture) of (i) at least one disperse anthraquinone dyestuff of the formula:

Formula II

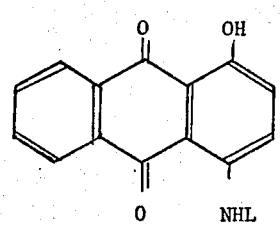

which can contain up to 30% of its own weight of a disperse anthraquinone dyestuff of the formula:

Formula III

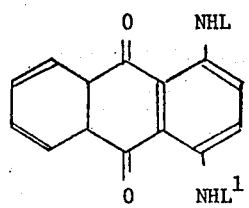

wherein L and $L^1$ each independently represent a phenyl radical which can be substituted by one or more chlorine or bromine atoms or by hydroxy, amino, lower alkyl, lower alkoxy, hydroxyloweralkoxy, N-lower alkylamino, acylamino, N:N-di (lower alkyl)amino, carbo lower alkoxy, lower alkoxycarbonyloxy or lower alkylcarbonyloxy groups; and c. from 0 to 50 by weight (based on the total weight of dyestuffs present in the mixture) of at least one yellow to red disperse dyestuff.

The process of the invention may be conveniently carried out by immersing the aromatic polyester textile material in a dyebath comprising an aqueous dispersion of a dyestuff mixture as hereinbefore defined, the dispersion being stabilised, if desired, by dispersing agents, for example non-ionic dispersing agents, cationic dispersing agents or anionic dispersing agents or a mixture of two or more such dispersing agents. Dyeing is then carried out at the temperature usually employed for applying disperse dyestuffs to such textile materials.

Thus the dyeing process can either be carried out at a temperature between 90° and 100° C, preferably in the presence of a carrier such as diphenyl or o-hydroxydiphenyl, or at a temperature above 100° C. preferably at a temperature between 120° C and 140° C. under superatmospheric pressure when a carrier is not necessary.

Alternatively an aqueous dispersion of a said dyestuff mixture can be padded onto the aromatic polyester textile material, and the dyestuffs are then fixed on the textile material by steaming it for short periods at temperatures between 100° C and 180° C or by baking it at temperatures between 160° C and 220° C. If desired the padding liquor can contain the conventional additives, for example dispersing agents, thickeners, migration inhibitors, or urea.

As a further alternative a thickened printing paste containing the dyestuff mixture in dispersed form can be applied to the surface of the aromatic polyester textile material by any of the methods conventionally used for applying printing pastes to aromatic polyester textile materials, for example by block, screen or roller printing. The printed textile material, optionally after being dried, is then steamed for short periods at temperatures between 100° C and 180° C, or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

At the conclusion of the process the coloured textile material is preferably rinsed in water and/or given a treatment in an aqueous solution of soap or a synthetic detergent before being dried. It is however preferred to subject the colored textile material to a treatment in an alkaline aqueous solution of sodium hydrosulphite before the soaping treatment in order to remove loosely attached dyestuff from the surface of the textile material.

It is preferred that the amount of the dyestuff of Formula I present in the said mixture is from 5% to 20% by weight (based on the total weight of dyestuffs in the mixture), and also that the amount of the yellow to red disperse dyestuff does not exceed 25% by weight (based on the total weight of dyestuffs in the mixture).

It is further preferred that in the dyestuffs of Formula I

Z is nitro or cyano,
Y is hydrogen,
T is hydrogen, lower alkyl or lower alkoxy,
W is an acylamino group of the formula —NHCO lower alkyl, and R$^1$ and R$^2$ are each independently hydrogen or an optionally substituted lower alkyl radical.

Throughout this specification the terms "lower alkyl" and "lower alkoxy" are used to denote alkyl and alkoxy radicals respectively containing from 1 to 4 carbon atoms.

As examples of the lower alkyl radicals represented by Y and X$^1$ there may be mentioned methyl, ethyl, n-propyl and n-butyl.

As examples of the substituted phenyl radicals represented by Y and Z there may be mentioned tolyl, chlorophenyl, nitrophenyl and nitrotolyl. As examples of the optionally substituted lower alkoxy carbonyl radicals represented by Z there may be mentioned methoxycarbonyl and ethoxycarbonyl, hydroxy lower alkoxy carbonyl such as β-hydroxyethyloxycarbonyl, cyano lower alkyl such as β-cyanoethoxycarbonyl, and lower alkoxy carbonyl such as β-methoxyethoxycarbonyl. The carbonamido groups represented by Z are of the formula

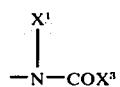

wherein L$^1$ is hydrogen, lower alkyl or phenyl and L$^2$ is hydrogen of lower alkyl; and as examples of the said groups there may be mentioned carbonamido itself and N-methyl and N:N-diethylcarbonamido.

As examples of the optionally substituted lower alkyl radicals represented by T there may be mentioned methyl, ethyl, n-propyl and n-butyl, hydroxy lower alkyl such as β-hydroxyethyl, lower alkoxy lower alkyl such as methoxymethyl, and lower alkoxycarbonyl lower alkyl such as ethoxycarbonylmethyl. As examples of the optionally substituted lower alkoxy radicals represented by T there may be mentioned methoxy and ethoxy, hydroxy lower alkoxy such as β-hydroxyethoxy, lower alkylcarbonyloxy lower alkoxy such as β-acetoxyethoxy, lower alkoxy such as β-methoxyethoxy and lower alkoxycarbonyl lower alkoxy such as β-methoxycarbonyl ethoxy. It is preferred that T is attached to the benzene ring in para position to W, and that T represents hydrogen, lower alkyl or lower alkoxy.

As examples of the radicals represented by X$^2$ there may be mentioned alkyl in particular lower alkyl such as methyl, ethyl, propyl and butyl, hydroxy lower alkyl such as β-hydroxyethyl, cyano lower alkyl such as β-cyanoethyl, chloro lower alkyl such as chloromethyl, lower alkylcarbonyl lower alkyl such as acetylmethyl, lower alkyl carbonyloxy lower alkyl such as β-acetoxyethyl, phenyl and substituted derivatives thereof such as tolyl, anisyl, dimethoxyphenyl and chlorophenyl, and heterocyclic radicals such as pyrid-2-yl and thien-2-yl radicals. It is however preferred that W represents an acylamino group of the formula

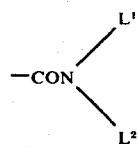

wherein X$^1$ and X$^3$ are each independently hydrogen or lower alkyl, and preferably X$^1$ is hydrogen.

The optionally substituted alkyl radicals represented by R$^1$ and R$^2$ are preferably optionally substituted lower alkyl radicals such as methyl, ethyl, n-propyl and n-butyl, hydroxy lower alkyl such as β-hydroxyethyl, δ-hydroxybutyl and β:γ-dihydroxypropyl, lower alkoxy lower alkyl such as β-ethoxyethyl and γ-methoxypropyl, cyano lower alkyl such as β-cyanoethyl, chloro lower alkyl such as β-chloroethyl and γ-chloropropyl, lower alkylcarbonyloxy lower alkyl such as β-acetoxyethyl, lower alkoxycarbonyl lower alkyl such as β-(methoxy- or ethoxycarbonyl)ethyl and α:β-di(methoxycarbonyl)ethyl, hydroxy lower alkoxy carbonyl lower alkyl such as β-(β'-hydroxyethoxycarbonyl)ethyl, lower alkoxy lower alkoxycarbonyl lower alkyl such as β-(β'-methoxyethoxycarbonyl)ethyl, lower alkoxy lower alkoxy lower alkoxycarbonyl lower alkyl such as β-[β'-(β''-methoxyethoxy)ethoxy carbonyl]ethyl, phenylcarbonyloxy lower alkyl such as β-benzoyloxy ethyl, lower alkoxycarbonyloxy lower alkyl such as β-ethoxycarbonyloxy ethyl, lower alkylsulphonyloxy lower alkyl such as β-methoxysulphonyloxyethyl, lower alkylcarbonyl lower alkyl such as β-acetylethyl, lower alkoxy lower alkyl carbonyloxy lower alkyl such as β-(β'-methoxypropionyl)ethyl, benzoyl lower alkyl such as benzoylmethyl, lower alkoxycarbonyl lower alkoxy lower alkyl such as β-(β'-methoxycarbonylethoxy)ethyl, lower alkoxy carbonyl lower alkylthio lower alkyl such as β-(ethoxycarbonylmethylthio)ethyl, cyclohexyloxycarbonyl lower alkyl such as β-cyclohexyloxycarbonylethyl, lower alkyl sulphonyl lower alkyl such as β-methylsulphonyl ethyl, and phenoxycarbonyloxy lower alkyl such as β-phenoxycarbonyloxyethyl and β-anisyloxycarbonyloxyethyl. As examples of the 5- or 6-membered nitrogen-containing heterocyclic rings formed by R$^1$, R$^2$ and the nitrogen atom N there may be mentioned pyrrolidone, morpholine and piperidine rings.

The said dyestuffs of Formula I can be obtained by diazotising an amine of the formula:

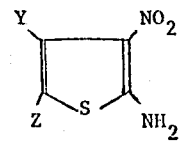

and coupling the resulting diazo compound with a coupling component of the formula:

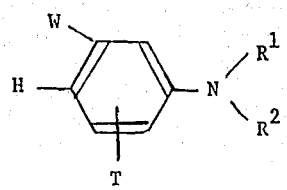

wherein, Y, Z, W, T, R$^1$ and R$^2$ have the meanings stated, the amine and coupling component being free from carboxylic acid and sulphonic acid groups, the said reactions being carried out by conventional methods.

As examples of the said substituents which are optionally present on the phenyl radical represented by L and L$^1$ there may be mentioned methyl, ethyl, methoxy, ethoxy, β-hydroxyethoxy, propoxy, butoxy, methylamino, dimethylamino, diethylamino, carbomethoxy, carboethoxy, methoxycarbonyloxy, acetyloxy, formylamino, acetylamino, propionylamino and benzoylamino.

The dyestuffs of Formula II can themselves be obtained, for example, by the condensation of a mixture of quinizarin and leucoquinizarin optionally with an arylamine of the formula L—NH$_2$, wherein L has the meaning stated above, in the presence of boric acid and a liquid such as water and/or water-miscible organic liquid. Whilst the initial condensation product (i.e. Formula II) is obtained, some bis-condensation usually occurs so that the product comprises a mixture of the dyestuffs of Formulae II and III. However, the reaction is carried out under such conditions that the formation of the dyestuff of Formula III is kept to a minimum and in no event exceeds 30%, and in fact is preferably less than 20%, by weight of the dyestuff of Formula II.

The yellow to red disperse dyestuffs which can be present in the dyestuff mixtures of the invention can be any of the yellow to red disperse dyestuffs which are conventionally employed in dyeing aromatic polyester textile materials and the shades of which fall within the areas 1 to 9 inclusive of the Hue Indication Chart in the third edition of the Color Index which was published by the Society of Dyers and Colorists in 1971. Such dyestuffs are described in, for example, the third edition of the Color Index or in British Specifications Nos. 1,256,093, 1,256,355 and 1,256,714.

According to a further feature of the invention there is provided a dyestuff mixture comprising
  a. from 2% to 60% by weight (based on the total weight of dyestuffs in the mixture) of a disperse azo dyestuff of Formula I,
  b. from 40% to 95% by weight (based on the total weight of dyestuffs in the mixture) of (i) a disperse anthraquinone dyestuff of Formula II which can contain up to 30% of its own weight of a disperse anthraquinone dyestuff of Formula III,
  c. from 0 to 50% by weight (based on the total weight of dyestuffs in the mixture) of at least one yellow to red disperse dyestuff, and
  d. optionally a diluent The dyestuff mixtures of the invention can be obtained by simply mixing the various components together in the required proportions. Since, however, the said mixtures are to be used for dyeing aromatic polyester textile materials from aqueous dyebaths the mixtures generally contain as diluent dispersing agents which are conventionally employed in preparing commercially available forms of disperse dyestuffs. Such mixtures can be obtained by milling or grinding together the various dyestuff components in the stated proportions in the presence of one or more diluents and, if desired, in the presence of water and subsequently removing the water from the resulting dispersion and/or standardising the mixture by the addition of conventional diluents such as dispersing agents, dedusting agents and/or water-soluble organic liquids.

By the process of the invention aromatic polyester textile materials are colored in blue to black shades possessing excellent fastness to light and to wet treatments such as perspiration. The dyestuff mixtures also have excellent build-up properties on the said textile materials enabling heavy depths of shade to be readily obtained.

The invention is illustrated but not limited by the following Examples in which the parts and percentages are by weight.

EXAMPLE 1.

100 Parts of a woven polyethylene terephthalate textile material are immersed in a dyebath comprising a dispersion of 2 parts of the dyestuff mixture, obtained as described below, in 3000 parts of water containing 1 part of the disodium salt of bis (2-sulphonaphth-1-yl) methane and 1 part of the sodium salt of a sulphated cetyl/oleyl alcohol mixture, and dyeing is then carried out for 1 hour at 130° C under superatmospheric pressure. The dyed textile material is then removed from the dyebath, rinsed in water, treated for 15 minutes at 50° C in an aqueous solution containing 0.2% of sodium hydroxide and 0.2% of sodium hydrosulphite, rinsed in water, "soaped" for 10 minutes in a 0.2% aqueous solution of a synthetic detergent at 100° C rinsed again in water and is finally dried.

The textile material is thereby dyed a navy blue shade having excellent fastness to light.

The dyestuff mixture used in the above Example was obtained by intimately mixing together 0.2 part of the dyestuff obtained by coupling diazotised 2-amino-3:5-dinitrothiophene onto 3-acetylamino-N:N-diethylaniline and 1.8 parts of a 85:15 mixture of 1-hydroxy-4-anilinoanthraquinone and 1:4-dianilinoanthraquinone. This mixture of anthraquinone compounds was itself obtained by heating a mixture of 81 parts of quinizarin, 27 parts of leucoquinizarin, 63 parts of aniline, 54 parts of boric acid, 380 parts of ethanol and 125 parts of water for 12 hours at the boil, adding 18 parts of sodium m-nitrobenzenesulphonate and 36 parts of sodium hydroxide, stirring at the boil for a further hour, cooling to 15° C, and filtering off the precipitated solid which was washed with water, and dried.

EXAMPLE 2

In place of the 2 parts of the dyestuff mixture used in Example 1 there are used 2 parts of the dyestuff mixture obtained by mixing together 1.8 parts of the anthraquinone dyestuff mixture obtained as described below and 0.2 part of the dyestuff obtained by coupling diazotised 2-amino-3:5-dinitrothiophene onto 3-acetylamino-N:N-diethylaniline. A navy blue dyeing of good light fastness if obtained.

The said anthraquinone dyestuff mixture was prepared stirring a mixture of 7.68 parts of quinizarin, 1.92 parts of leucoquinizarin, 5.4 parts of boric acid, 3.94 parts of p-anisidine, 3.49 parts of m-aminophenol and 90 parts of ethanol for 16 hours at the boil. The mixture was cooled and the solid filtered off, washed with water and dried. The mixture consists essentially of 1-hydroxy-4-(p-anisidino) anthraquinone, 1-hydroxy-4-(m-hydroxyanilino) anthraquinone, 1:4-di(p-anisidino) anthraquinone and 1:4-di(m-hydroxyanilino) anthraquinone in the approximate proportions of 60 28:10:2.

In place of the anthraquinone dyestuff mixture used in the Example there are used the anthraquinone dyestuff mixtures which are similarly obtained by replacing the mixture of p-anisidine and m-aminophenol used above by mixtures of a. aniline and p-anisidine
b. aniline and p-toluidine
c. p-anisidine and p-toluidine
d. m-aminophenol and p-aminophenol when similar navy blue dyeings are obtained.

EXAMPLE 3

In place of the 2 parts of the dyestuff mixture used in Example 1 there are used 2 parts of the dyestuff mixture obtained by mixing together 0.3 part of the dyestuff obtained by coupling diazotised 2-amino-3:5-dinitrothiophene onto 3-acetylamino-N:N-diethylaniline and 1.7 parts of an 85:15 mixture of 1-hydroxy-4-[p-($\beta$-hydroxyethoxy)anilino] anthraquinone and 1:4-di[p-($\beta$-hydroxyethoxy)anilino] anthraquinone when a navy blue dyeing of excellent fastness properties is obtained.

The above mixture of anthraquinone compounds was itself obtained by heating a mixture of 7.68 parts of quinizarin, 1.94 parts of leucoquinizarin, 7.35 parts of $\beta$-(p-aminophenoxy)ethanol, 5.4 parts of boric acid, 24 parts of ethanol and 15 parts of water for 11 hours at 85° C, cooling to 15° C, and filtering off the precipitated solid which was washed with aqueous alcohol, then with a 1% aqueous solution of sodium hydroxide, finally with water, and then dried.

EXAMPLE 4

In place of the 2 parts of the dyestuff mixture used in Example 1 there are used 2 parts of the dyestuff mixture obtained by mixing together 0.2 part of the dyestuff obtained by coupling diazotised 2-amino-3:5-dinitrothiophene onto 3-acetarylamino-N:N-diethylaniline and 1.8 parts of an 85:15 mixture of 1-hydroxy-4-p-methoxyanilinoanthraquinone and 1:4-di-p-methoxyanilinoanthraquinone. A navy blue dyeing of good light fastness is obtained.

EXAMPLE 5

In place of the 0.2 part of the dyestuff obtained by coupling diazotised 2-amino-3:5-dinitrothiophene onto 3-acetylamino-N:N-diethylaniline used in Example 1 there may be used 0.2 part of any of the following dyestuffs obtained a. by coupling diazotised 2-amino-3:5-dinitrothiophene onto 2-methoxy-5-acetylamino-N:N-di($\beta$-methoxyethyl)aniline,
b. by coupling diazotised 2-amino-3:5-dinitro-thiophene onto 3-acetylamino-N:N-di($\beta$-hydroxyethyl)aniline,
c. by coupling diazotised 2-amino-3:5-dinitrothiophene onto 3-acetylamino-N:N-di($\beta$-hydroxypropyl)aniline,
d. by coupling diazotised 2-amino-3:5-dinitrothiophene onto 3-formylamino-N:N-di(n-butyl) aniline,
e. by coupling diazotised 2-amino-3:5-dinitrothiophene onto 3-acetylamino-N:N-di($\gamma$-hydroxypropyl)aniline,
f. by coupling diazotised 2-amino-3:5-dinitrothiophene onto 3-acetylamino-N-ethyl-N-($\omega$-hydroxypentyl)aniline, whence similar navy blue dyeings of good fastness properties are obtained.

EXAMPLE 6

In place of the 2 parts of the dyestuff mixture used in Example 1 there are used 4 parts of the dyestuff mixture obtained by mixing together 2.13 parts of a 85:15 mixture of 1-hydroxy-4-anilinoanthraquinone and 1,4-dianilinoanthraquinone, 0.11 part of the dyestuff obtained by coupling diazotised 2-amino-3:5-dinitrothiophene onto 3-acetylamino-N:N-diethylaniline, 0.98 part of CI Disperse Orange 1 and 0.78 part of CI Disperse Yellow 1. This mixture dyed polyethylene terephthalate textile material in a black shade showing good fastness properties.

We claim:
1. Process for the colouration of aromatic polyester textile materials which comprises applying to the said textile material by a dyeing, padding or printing process an aqueous dispersion of a dyestuff mixture consisting of:

a. from 2 to 60% by weight (based on the total weight of dyestuffs in the mixture) of a water insoluble monoazo dyestuff, free from sulphonic and carboxylic acid groups, which is of the formula:

Formula 1

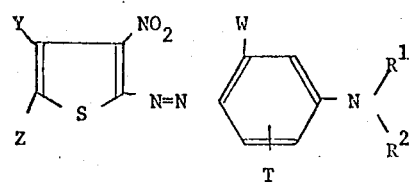

wherein
Y is hydrogen, lower alkyl, optionally substituted phenyl or nitro;
Z is nitro, cyano, optionally substituted phenyl, optionally substituted lower alkoxycarbonyl or carbonamido; T is hydrogen, optionally substituted lower alkyl or optionally substituted lower alkoxy;
W is an acylamino group of the formula:

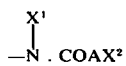

wherein
$X^1$ is hydrogen or lower alkyl, $X^2$ is hydrogen or an optionally substituted hydrocarbon or heterocyclic radical, and A is a direct link or —O— or

and $R^1$ and $R^2$ each independently represent a hydrogen atom or an optionally substituted alkyl radical or $R^1$ and $R^2$ together form with the nitrogen atom N a 5- or 6-membered nitrogen-containing heterocyclic ring;

b. from 40 to 95% by weight (based on the total weight of dyestuffs in the mixture) of (i) at least one disperse anthraquinone dyestuff of the formula:

Formula II

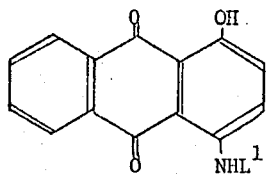

which can contain up to 30% of its own weight of a disperse anthraquinone dyestuff of the formula:

Formula III

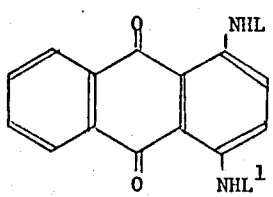

wherein

L and $L^1$ each independently represent a phenyl radical which can be substituted by one or more chlorine or bromine atoms or by hydroxy, amino, lower alkyl, lower alkoxy, hydroxyloweralkoxy, N-lower alkylamino, acylamino, N:N-di (lower alkyl)amino, carbo lower alkoxy, lower alkoxycarbonyloxy or lower alkylcarbonyloxy groups; and c. from 0 to 50% by weight (based on the total weight of dyestuffs present in the mixture) of at least one yellow to red disperse dyestuff.

2. Process as claimed in claim 1 wherein the quantity of the yellow to red disperse dyestuff does not exceed 25% by weight, based on the total weight of dyestuffs in the mixture.

3. Process as claimed in claim 1 wherein in the azo dyestuff of Formula I, Z is nitro or cyano, Y is hydrogen, T is hydrogen, lower alkyl or lower alkoxy, W is an acylamino group of the formula —NHCO lower alkyl, and $R^1$ and $R^2$ are each independently hydrogen or an optionally substituted lower alkyl radical.

* * * * *